(12) United States Patent
El-Barbari et al.

(10) Patent No.: US 8,144,490 B2
(45) Date of Patent: Mar. 27, 2012

(54) OPERATION OF A THREE LEVEL CONVERTER

(75) Inventors: Said Farouk Said El-Barbari, Freising (DE); Robert Roesner, Unterfoehring (DE); Jie Shen, Ingolstadt (DE)

(73) Assignee: General Electric Company, Niskayuna, NY (US)

( * ) Notice: Subject to any disclaimer, the term of this patent is extended or adjusted under 35 U.S.C. 154(b) by 158 days.

(21) Appl. No.: 12/615,566

(22) Filed: Nov. 10, 2009

(65) Prior Publication Data

US 2011/0109285 A1    May 12, 2011

(51) Int. Cl.
*H02M 7/487* (2007.01)
(52) U.S. Cl. .................. 363/43; 323/906; 363/132
(58) Field of Classification Search ........... 363/43, 363/40–41, 95, 98, 132, 56.02; 323/906
See application file for complete search history.

(56) References Cited

U.S. PATENT DOCUMENTS

| | | | | |
|---|---|---|---|---|
| 5,506,765 | A * | 4/1996 | Nakata et al. ................ | 363/98 |
| 6,353,547 | B1 * | 3/2002 | Jang et al. .................... | 363/132 |
| 6,757,185 | B2 | 6/2004 | Rojas Romero | |
| 7,126,409 | B2 * | 10/2006 | Nielsen ......................... | 327/391 |
| 7,495,938 | B2 | 2/2009 | Wu et al. | |
| 7,706,163 | B2 * | 4/2010 | Tan et al. ..................... | 363/132 |

FOREIGN PATENT DOCUMENTS

EP    512531 A2 * 11/1992

OTHER PUBLICATIONS

Rojas et al.: "An Improved Voltage Vector Control Method for Neutral-Point-Clamped Inverters"; Downloaded from the Internet:<http://ieeexplore.ieee.org/stamp/stamp.jsp?tp=&arnumber=471286&isnumber=9936>; EEE Transactions on Power Electronics, vol. 10, No. 6, Nov. 1995; pp. 666-672.

Ahmad Radan, Hengameh Kojooyan Jafari; "Improved Design of Three-Level NPC Inverters in Comparison to Two-Level Inverters"; Downloaded from the Internet<http://www.wseas.us/e-libraryitransactions/circuits/2009/28-845.pdf>; WSEAS Transactions on Circuits and Systems; Issue 2, vol. 8, Feb. 2009; pp. 207-216.

* cited by examiner

*Primary Examiner* — Harry Behm
(74) *Attorney, Agent, or Firm* — Ann M. Agosti (57) ABSTRACT

A method of operating a three level converter includes controlling the output voltage of the converter when a DC link voltage of the three level converter is lower than one-half of a rated DC link voltage of the converter by, for each leg of the converter, alternately connecting an output terminal of the leg to the positive terminal or the negative terminal of the DC link. When the DC link voltage is at least one-half of the rated DC link voltage, the method includes controlling the output voltage of the converter by, for each leg, selectively connecting the output terminal of the converter to the positive terminal, the negative terminal, or a mid-point of the DC link.

19 Claims, 6 Drawing Sheets

OPERATION OF A THREE LEVEL CONVERTER

BACKGROUND

This invention relates generally to electric energy conversion, and, more specifically, to efficient connection of a photovoltaic module to a power grid or a load.

With the rising cost and scarcity of conventional energy sources and concerns about the environment, there is a significant interest in alternative energy sources such as solar power and wind power. Solar power generation uses photovoltaic (PV) modules to generate electricity from the sun. Multiple PV cells are connected electrically to one another in such systems. The electricity generated by PV modules is transmitted to the power grid through one or multiple power electronic converters such as diode clamped converters.

In general, the efficiency of power electronic converters used in photovoltaic systems is poor at partial load and high at medium to full load. Since the converters operate at partial load most of the time, overall efficiency of the PV systems is less than optimal. Hence, power losses of diode clamped multilevel converters are an important issue in unit sizing photovoltaic systems because of the influence of such losses on the total energy delivered to the load. Power losses occur in diode clamped converters mainly because of losses in switching devices such as Insulated Gate Bipolar Transistors (IGBTs), Gate Turn Off (GTO) Thyristors, Integrated Gate Commuted Thyristors (IGCTs) and diodes which are generally used in the converters or passive components such as filter inductors. The switching devices generally have three major types of losses: conduction losses, switching losses, and gate drive losses. Gate drive losses are not present in diodes. However, conduction losses and switching losses are very much part of the diode losses. Losses in fast switching diodes are typically higher than slow switching diodes. The switching losses correspond to the losses that occur during state changes of the switching device (during turn on and turn off). The conduction losses correspond to losses that occur in the switching device during its conduction (when the device is carrying a current). Gate drive losses refer to the energy required to charge and discharge gate-source and gate-drain capacitances of the switching devices and are affected by switching frequency, drain-source capacitance, and the voltage traversed. Filter inductor losses consist typically of copper and iron losses. Copper losses in power converters are typically increased by skin and proximity effects. Therefore, it is desirable to determine a method and a system that will address the foregoing issues.

BRIEF DESCRIPTION

In accordance with an embodiment of the present invention, a method of operating a three level converter is provided. The method includes controlling the output voltage of the converter when a DC link voltage of the three level converter is lower than one-half of a rated DC link voltage of the converter by, for each leg of the converter, alternately connecting an output terminal of the leg to the positive terminal or the negative terminal of the DC link. When the DC link voltage is at least one-half of the rated DC link voltage, the method includes controlling the output voltage of the converter by, for each leg, selectively connecting the output terminal of the converter to the positive terminal, the negative terminal, or a mid-point of the DC link.

In accordance with another embodiment of the present invention, a method of delivering solar power from a power generation system comprising a photovoltaic (PV) module is provided. The method includes providing DC power from the PV module to a three level converter. When a DC link voltage of a three level converter is less than a one-half of a rated DC link voltage of the converter, the method includes controlling the output voltage of the converter by, for each leg of the converter, alternately connecting an output terminal of the leg to the positive terminal or the negative terminal of the DC link. The method further includes controlling the output voltage of the converter when the DC link voltage is at least one-half of the rated DC link voltage by, for each leg, selectively connecting the output terminal of the converter to the positive terminal, the negative terminal, or a mid-point of the DC link.

In accordance with an embodiment of the present invention, a method of operating a three level neutral point clamped (NPC) converter is provided. The NPC converter includes first and second outer switching devices with first and second mechanical switches connected thereacross, first and second inner switching devices, first and second diodes and a split DC link having a first mid point connected across the two outer switching devices. The first outer and the first inner switching devices are connected in series at a second mid point, the first inner and the second inner switching devices are connected in series at a third mid point and the second inner and the second outer switching devices are connected in series at a fourth mid point. The first diode is connected between the first mid point and second mid point, and the second diode is connected in between the first mid point and the fourth mid point. The method includes maintaining the outer switching devices and mechanical switches in an ON state while alternately switching the inner switching devices to ON and OFF states when a DC link voltage of a leg of the NPC converter is less than one-half of a rated DC link voltage of the NPC converter. The method also includes generating a positive output voltage when a DC link voltage of a leg of the NPC converter is at least one-half of the rated DC link voltage of the NPC converter by maintaining mechanical switches in OFF state and alternatively switching the first outer switching device and the second inner switching device to ON and OFF states while the first inner switching device and the second outer switching device are in ON state and OFF state respectively. The method further includes generating a negative output voltage when a DC link voltage of a leg of the NPC converter is at least one-half of the rated DC link voltage of the NPC converter by maintaining mechanical switches in OFF state and alternatively switching the first inner switching device and second outer switching device to ON and OFF states while the first outer switching device and the second inner switching device are in OFF state and ON state respectively for negative output voltage.

In accordance with yet another embodiment of the present invention, a three-level neutral point clamped (NPC) converter comprising first and second outer switching devices with first and second mechanical switches connected thereacross and first and second inner switching devices is provided. The first inner and the second inner switching device are connected in series at a first mid point; the second inner and the second outer switching device are connected in series at a second mid point and the first outer and the first inner switching device are connected in series at a third mid point. The NPC converter also includes first and second diodes and a split DC link having a fourth mid point connected across first and second outer switching devices wherein the first diode is connected between the fourth mid point and the third mid point, and the second diode is connected in between the fourth mid point and the second mid point. The NPC converter further includes a controller configured to provide control signals to maintain the outer switching devices and mechanical switches in an ON state while alternately switching the inner switching devices to ON and OFF states when a DC link voltage of a leg of the NPC converter is less than one-half of a rated DC link voltage of the NPC converter. The controller is further configured to provide control signals when a DC link voltage of a leg of the NPC converter is at least one-half of the rated DC link voltage of the NPC converter to maintain the mechanical switches in OFF state and to alternatively switch the first outer switching device and second inner switching device to ON states while the first inner switching device and the second outer switching device are in ON state and OFF state respectively to generate positive output voltage.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention function to provide a system and a method for efficient power transfer from a solar power generation system to a load or a power grid.

Figure 1:
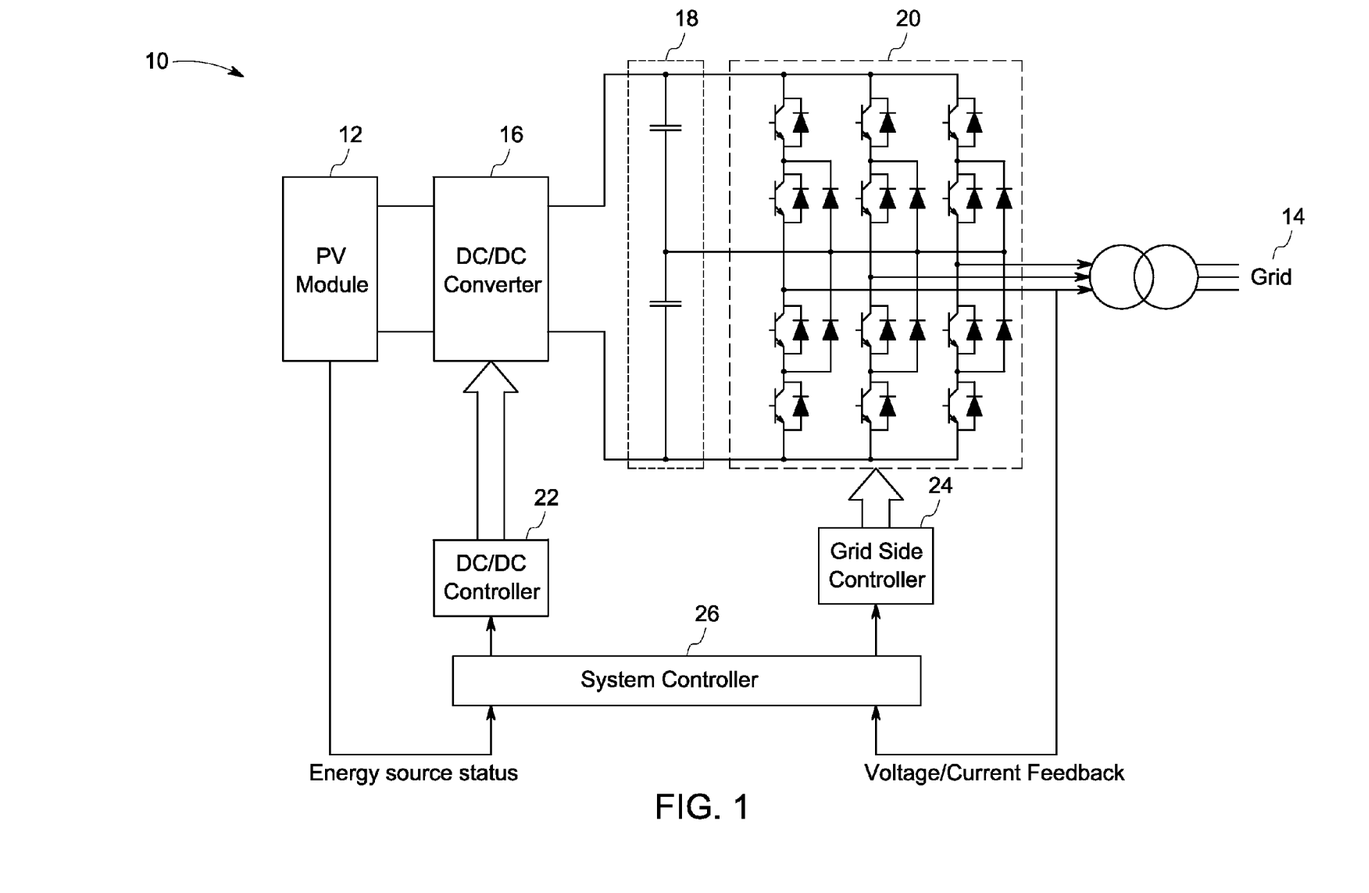
FIG. 1 is a block diagram of a conventional solar power generation system.

FIG. 1 illustrates a solar power generation system 10. The power generation system includes a PV module 12. The PV module is connected to a power grid 14 through a DC/DC converter 16, a DC link 18 and a grid side three-phase three level DC/AC converter 20. The DC/AC converter 20 maintains a constant DC voltage at the DC link 18, and thus the energy flow from the DC link 18 to the power grid 14 is managed. The DC/DC converter 16 is controlled by a DC/DC controller 22, and the grid side converter 20 is controlled by a grid side controller 24. A system controller 26 generates a reference DC voltage command for the DC/DC converter 22 and a reference output voltage magnitude command and a reference frequency command for the grid side converter 24. In one embodiment, the PV module 12 may be directly connected to the DC link 18 without utilizing any DC/DC converter in between. In another embodiment, the grid side three-phase converter may be replaced by multiple single-phase converters and/or a single controller may be used for the multiple control functions shown in FIG. 1.

Figure 2:
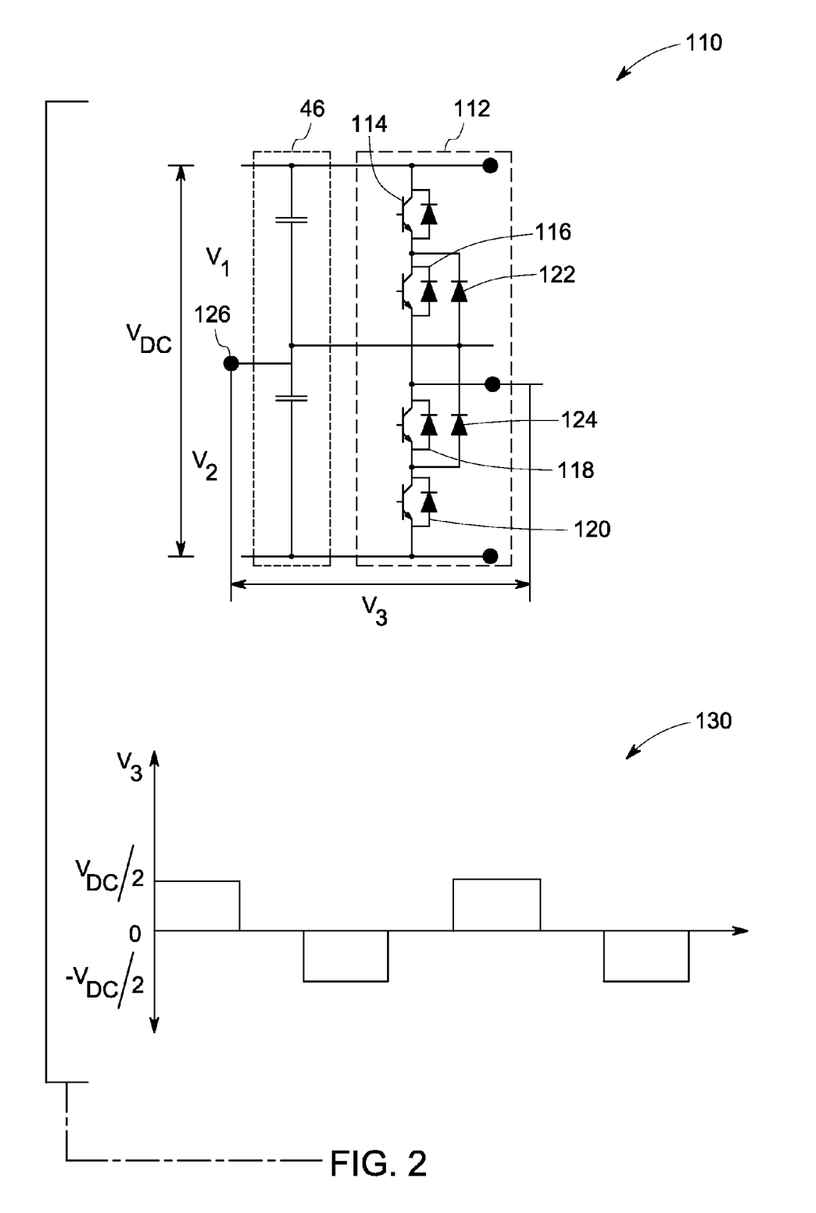
FIG. 2 is a circuit diagram of one leg of a neutral point clamped three level converter and its output waveform in accordance with an embodiment of the present invention.

FIG. 2 illustrates a schematic 110 of one leg 112 or one phase of a neutral point clamped (NPC) three level converter used in a solar power generation system and its output voltage waveform 130 in accordance with an embodiment of the present invention. In this embodiment, the one leg 112 of the NPC three level converter includes four switching devices 114, 116, 118 and 120 and two diodes 122 and 124. Input voltages V1 and V2 are controlled to maintain at Vdc/2 where Vdc is the total DC link voltage. Voltage V3 is the phase A output voltage measured with respect to a center point 126 of a DC link 46. Furthermore, device 114 is complementary of device 118, i.e., when the device 114 is conducting, device 118 is not conducting and vice versa. Similarly, devices 116 and 120 are complementary of each other.

In operation, the one leg of the NPC three level converter has three switching stages. In the first switching stage, the devices 114 and 116 are turned on and the devices 118 and 120 are turned off. Assuming a stable operation, V1=V2=Vdc/2, V3 becomes Vdc/2. In the second switching stage, devices 116 and 118 are turned on while devices 114 and 120 are turned off. In this stage, V3 is equal to zero. In this stage the output voltage V3 is equal to a voltage at the center tap or the center point 126 of the NPC three level converter. The center point 126 refers to a connection point between two DC link capacitors. In one embodiment, where there are more than two DC link capacitors, there may be more than one connection point depending on number of DC link capacitors utilized. In operation, depending on a load current supplied by the NPC three level converter to the power grid, the center point voltage may not remain stable and hence voltage V1 and V2 may fluctuate from the value Vdc/2. In one embodiment, when an output voltage of the PV module is less than a threshold voltage, the stability of the center point is controlled by the DC to DC converter; and when the output voltage of the PV module is higher than the threshold voltage, the stability of the center point is controlled by the multi-level converter.

In the third switching stage, devices 114 and 116 are turned off whereas devices 118 and 120 are turned on. This results in V3 becoming −Vdc/2 as shown in a waveform 130. Thus, it can be seen that the phase voltage V3 has three levels Vdc/2, 0 and −Vdc/2. In one embodiment, three such legs for a NPC three phase converter are combined and the resulting line voltages (with five levels: Vdc, Vdc/2, 0, −Vdc/2 and −Vdc) are fed to the power grid as shown in FIG. 1. It will be appreciated by those skilled in the art that the three-level converter 112 of FIG. 2 can be increased to any level depending on the circuit topology and thus depending on number of devices and diodes in the circuit. As the number of levels in the converter increase, the output waveform of the converter approaches a pure sine wave, resulting in lower harmonics in the output voltage.

It should be noted that the switching pulses for the switching devices may be generated by a pulse width modulation (PWM) technique. In one embodiment, the PWM technique may include a sine triangular PWM technique or a space vector PWM technique. In another embodiment, the circuit may also be used for a single-phase circuit. Further, the switching devices may include insulated gate bipolar transistors (IGBT) or Integrated Gate Commuted Thyristors (IGCT) or Metal Oxide Field Effect Transistors (MOSFET) or silicon carbide devices or combinations thereof.

Figure 3:
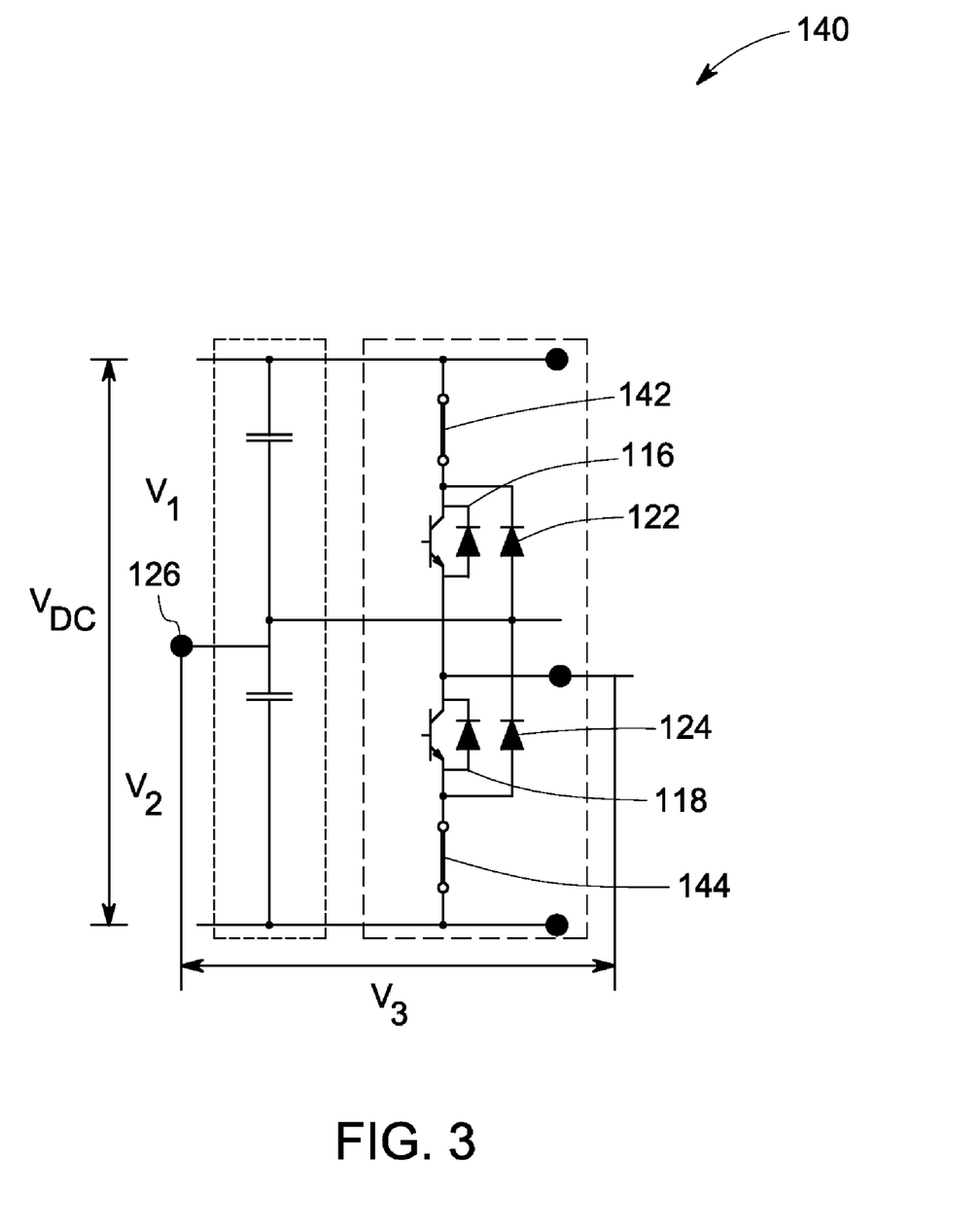
FIG. 3 is a diagram representing one mode of operation for a neutral point clamped three level converter in accordance with an embodiment of the present invention.

FIG. 3 illustrates a mode of operation 140 for a neutral point clamped three level converter in accordance with an embodiment of the present invention. In a conventional operation, as explained earlier, to synthesize a positive voltage at the output terminals of a NPC three level converter, the lower switching device 116 of the positive side is continuously turned on and the lower switching device 120 at the negative side is kept off whereas the upper switching device 114 of the positive side and the upper switching device 118 of the negative side are alternately switched on. Thus, when the switching device 114 is turned on, the output voltage V3 will be Vdc/2, and, when the switching device 118 is turned on, the output voltage V3 will be zero. Similarly, for synthesizing negative voltage, the upper switching device 114 of the positive side is continuously turned off and the upper switching device 118 at the negative side is kept on whereas the lower switching device 116 of the positive side and the lower switching device 120 of the negative side are alternately switched on.

In one embodiment disclosed herein, when the DC link voltage Vdc is higher than half a rated DC link voltage, the switching devices are turned on in the same way as in the conventional method. However, when the DC link voltage Vdc is lower than half the rated DC link voltage, then the outer switching devices 114 and 120 are kept on continuously (which in FIG. 3 is represented by two short circuits 142 and 144), whereas the inner switching devices 116 and 118 are switched on alternately. In one embodiment, this mode of operation is referred to as two level operation of the three level converter. Once the DC link voltage exceeds half the rated voltage, then the switching procedure is moved back to a normal switching procedure of three level NPC converter.

Figure 4:
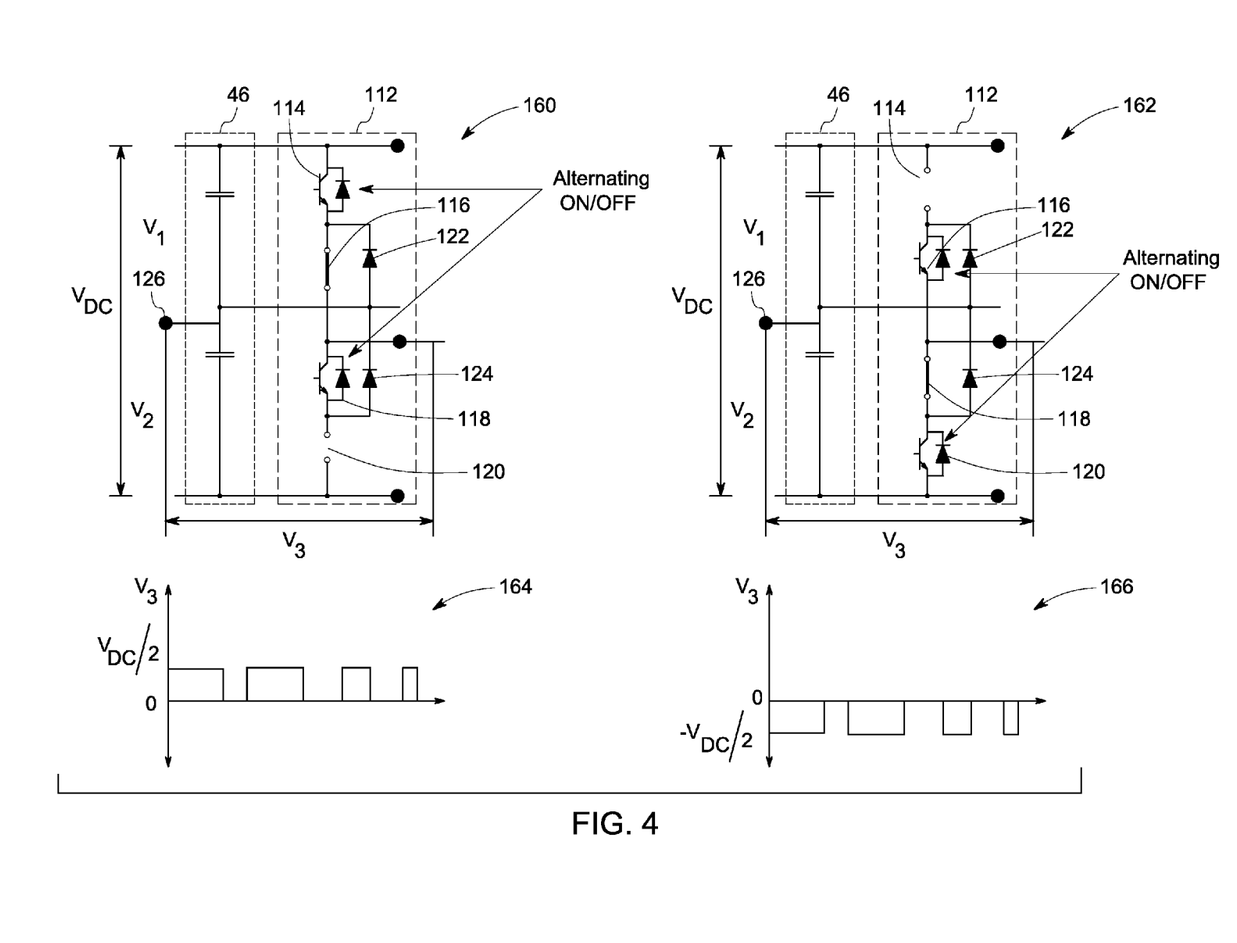
FIG. 4 is a diagram representing operation of the NPC three level converter when the DC link voltage is equal to or higher than half the rated DC link voltage.

FIG. 4 shows the operation of the NPC three level converter when the DC link voltage is equal to or higher than half the rated DC link voltage. The operation is shown with respect to two embodiments 160, 162 and its output voltage plots 164 and 166 respectively. When the required output phase voltage of the converter is positive, the first inner switching device 116 is kept ON and the second outer switching device 120 is kept OFF whereas the first outer switching device 114 and second inner switching device 118 are turned ON and OFF alternately as shown in the circuit 160. This results in positive output voltage of the converter as shown in the plot 164. Similarly, when the required output phase voltage of the converter is negative, the first outer switching device 114 is kept OFF and the second inner switching device 118 is kept OFF whereas the first inner switching device 116 and second outer switching device 120 are alternately turned ON and OFF as shown in the circuit 162 and the negative output voltage as shown in the plot 166.

Figure 5:
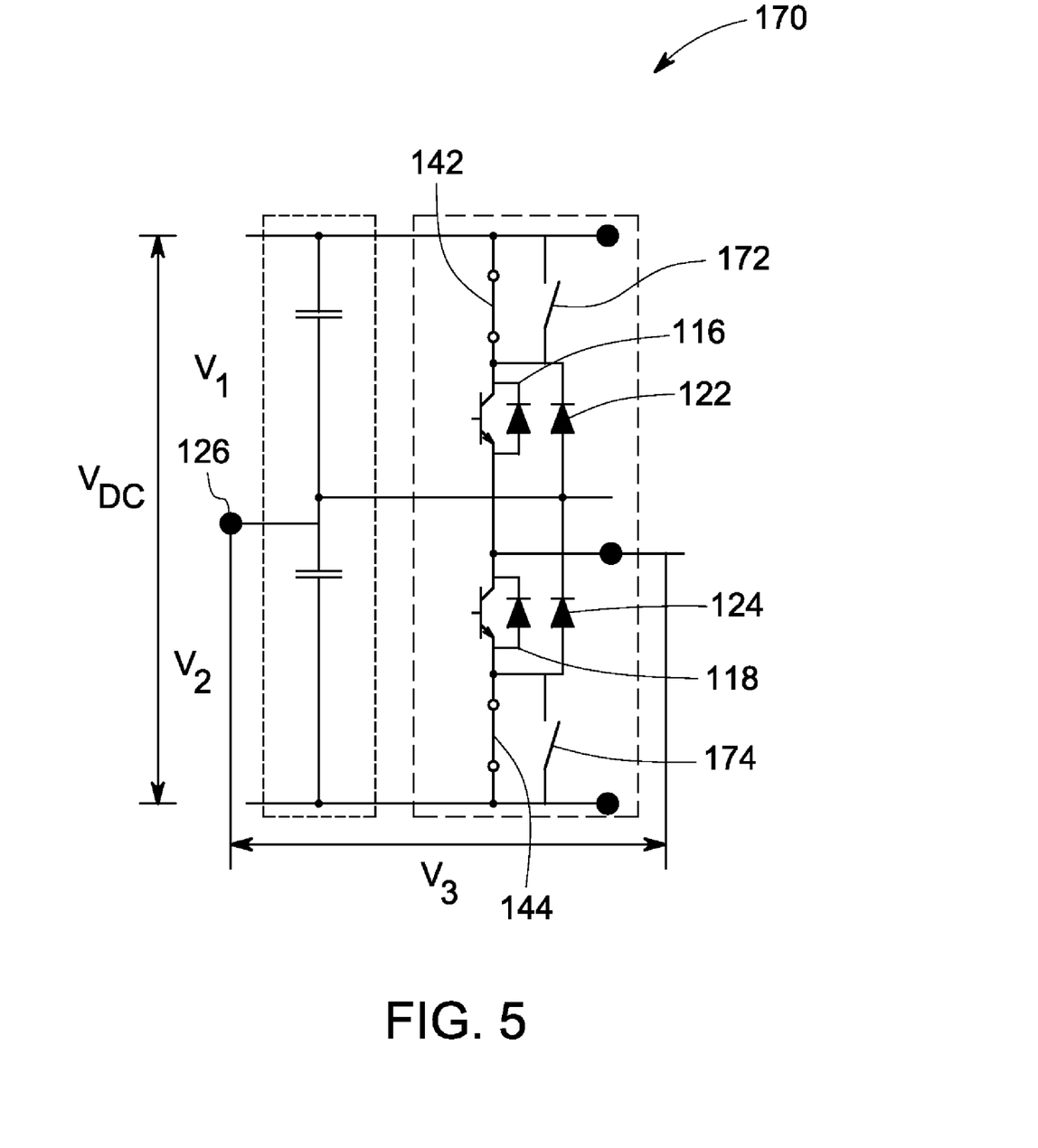
FIG. 5 is a diagram representing another mode of operation for a neutral point clamped three level converter utilizing mechanical switches in accordance with an embodiment of the present invention.

FIG. 5 illustrates another mode of operation 170 for a neutral point clamped three level converter utilizing mechanical switches in accordance with an embodiment of the present invention. In this embodiment, two mechanical switches 172 and 174 are connected across outer switching devices 142 and 144 respectively. When the DC link voltage Vdc is higher than half the rated DC link voltage, mechanical switches 172 and 174 are turned OFF continuously, whereas when the DC link voltage Vdc is lower than half the rated DC link voltage mechanical switches are turned ON continuously along with the switching devices 142 and 144. This results in increased efficiency of the converter by reducing conduction losses of the switching devices 142 and 144.

Figure 6:
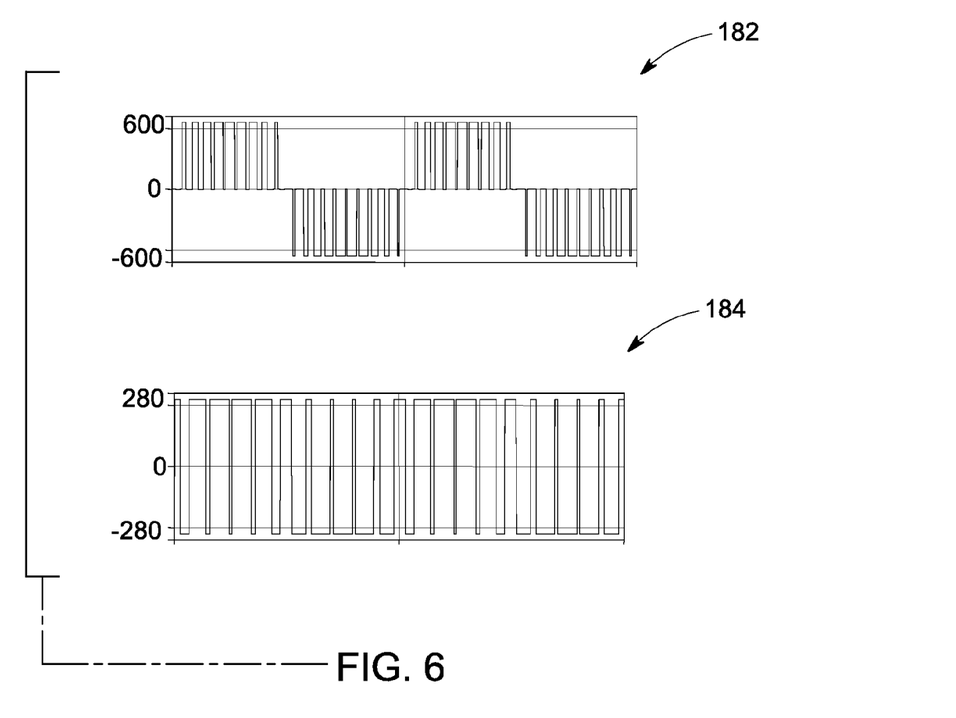
FIG. 6 is a diagrammatical representation of output voltage waveforms of the NPC three level converter utilizing the operational mode of FIG. 3 in accordance with an embodiment of the present invention.

FIG. 6 shows output voltage waveforms of the NPC three level converter utilizing one method in accordance with an embodiment of the present invention. Waveform 182 shows output voltage of the three level converter when the DC link voltage is higher than half the rated DC link voltage. In this embodiment, the rated DC link voltage is 600 Volts. Thus, when the DC link voltage is higher than half the rated DC link voltage the output voltage has three levels Vdc=600, zero, and −Vdc=−600. Further, waveform 184 shows output voltage of the three level converter when the DC link voltage is lower than half the rated DC link voltage i.e. 300 volts in this case. It can be seen that the output voltage in this case has only two levels Vdc=280 and Vdc=−280. It should also be noted that the zero level is not present in this case.

Figure 7:
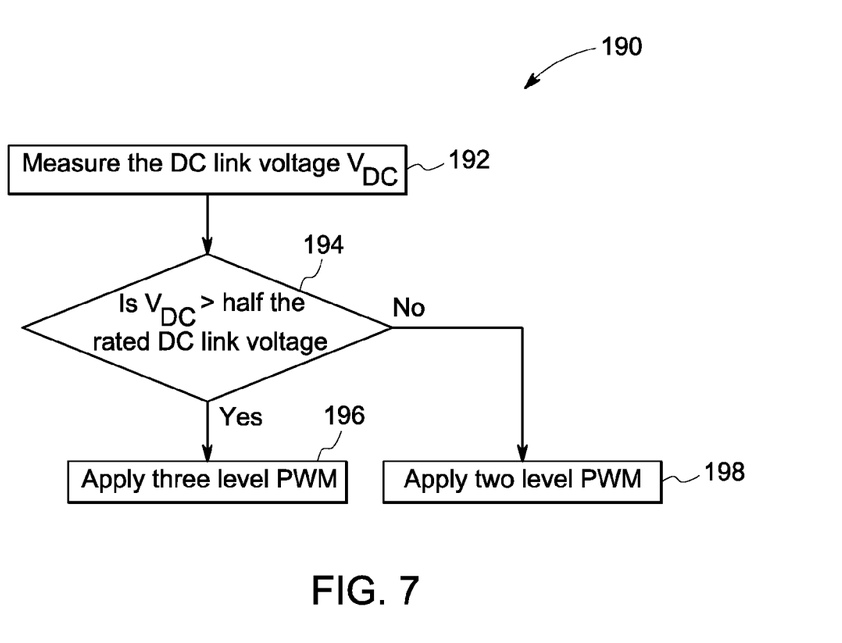
FIG. 7 is a flow chart for a method of operating the three level converter in accordance with an embodiment of the present invention.

FIG. 7 shows a method 190 of operating the NPC three level converter in accordance with an embodiment of the present invention. The method includes measuring the DC link voltage Vdc in step 192. The measured DC link voltage Vdc is then compared in step 194 with half the rated DC link voltage. If the measured DC link voltage is higher than half the rated DC link voltage then a conventional three level pulse width modulation (PWM) is applied to switching devices of the three level converter in step 196. The three level PWM refers to controlling the output voltage of the converter by, for each leg, selectively connecting the output terminal of the converter to the positive terminal, the negative terminal, or a mid-point of the DC link. However, if the DC link voltage is lower than half the rated DC link voltage then a two level PWM is applied to switching devices of the three level converter in step 198. As explained earlier the two level PWM refers to the operation of the three level converter where only two devices are switched on alternately and other two switching devices are kept in on state and off state respectively. In other words, controlling the output voltage of the converter by, for each leg of the converter, alternately connecting an output terminal of the leg to the positive terminal or the negative terminal of the DC link. It should be noted that the PWM waveforms may be generated by sine triangular PWM technique or space vector PWM technique or similar other PWM techniques.

One advantage of the proposed method of operating a NPC three level converter is that it provides higher efficiency of the three level converter. Furthermore, when the proposed PWM method is used in a photovoltaic system, the photovoltaic converters have higher partial load efficiency. This enables higher Annualized Energy Production (AEP) for the photovoltaic system. The proposed method of operating a NPC three level converter may also be used in other power generating systems such as fuel cell or battery energy storage power generating systems.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of operating a three level converter comprising:
    when a DC link voltage of the three level converter is lower than one-half of a rated DC link voltage of the converter, controlling the output voltage of the converter by, for each leg of the converter, alternately connecting an output terminal of the leg to the positive terminal or the negative terminal of the DC link; and
    when the DC link voltage is at least one-half of the rated DC link voltage, controlling the output voltage of the converter by, for each leg, selectively connecting the output terminal of the converter to the positive terminal, the negative terminal, or a mid-point of the DC link;
    wherein controlling the output voltage of the converter when the DC link voltage is lower than one-half the rated DC link voltage further comprises maintaining outer switching devices of the three level converter in an ON state while alternately switching inner switching devices of the three level converter to ON and OFF states.

2. The method of claim 1, wherein switching pulses for the switching devices are generated by a pulse width technique (PWM) technique.

3. The method of claim 2, wherein the PWM technique comprises sine triangular PWM or space vector PWM.

4. The method of claim 1, further comprising providing DC power to the three level converter from a photovoltaic module, a fuel cell, or a battery.

5. A method of delivering solar power from a power generation system comprising a photovoltaic (PV) module, the method comprising:
    providing DC power from the PV module to a three level converter;
    when a DC link voltage of a three level converter is less than a one-half of a rated DC link voltage of the converter, controlling the output voltage of the converter by, for each leg of the converter, alternately connecting an output terminal of the leg to the positive terminal or the negative terminal of the DC link; and when the DC link voltage is at least one-half of the rated DC link voltage controlling the output voltage of the converter by, for each leg, selectively connecting the output terminal of the converter to the positive terminal, the negative terminal, or a mid-point of the DC link;

wherein controlling the output voltage of the converter when the DC link voltage is lower than one-half the rated DC link voltage further comprises maintaining outer switching devices of the three level converter in an ON state while alternately switching inner switching devices of the three level converter to ON and OFF states.

6. A method of operating a three-level neutral point clamped (NPC) converter comprising first and second outer switching devices with first and second mechanical switches connected thereacross, first and second inner switching devices, first and second diodes and a split DC link having a first mid point connected across the two outer switching devices wherein the first outer and the first inner switching devices are connected in series at a second mid point, the first inner and the second inner switching devices are connected in series at a third mid point; the second inner and the second outer switching devices are connected in series at a fourth mid point, the first diode is connected between the first mid point and second mid point, and the second diode is connected in between the first mid point and the fourth mid point, the method comprising:

maintaining the outer switching devices and mechanical switches in an ON state while alternately switching the inner switching devices to ON and OFF states when a DC link voltage of a leg of the NPC converter is less than one-half of a rated DC link voltage of the NPC converter;

generating a positive output voltage when a DC link voltage of a leg of the NPC converter is at least one-half of the rated DC link voltage of the NPC converter by maintaining mechanical switches in OFF state and alternatively switching the first outer switching device and the second inner switching device to ON and OFF states while the first inner switching device and the second outer switching device are in ON state and OFF state respectively; and generating a negative output voltage when a DC link voltage of a leg of the NPC converter is at least one-half of the rated DC link voltage of the NPC converter by maintaining mechanical switches in OFF state and alternatively switching the first inner switching device and second outer switching device to ON and OFF states while the first outer switching device and the second inner switching device are in OFF state and ON state respectively for negative output voltage.

7. The method of claim 6, wherein switching pulses for at least some of the switching devices are generated by a pulse width technique (PWM) technique.

8. The method of claim 7, wherein the PWM technique comprises sine triangular PWM or space vector PWM.

9. The method of claim 6, wherein the three level converter comprises a single phase three level converter.

10. The method of claim 6, wherein the three level converter comprises a three phase three level converter.

11. The method of claim 6, wherein the switching devices are selected from the group consisting of IGBTs, IGCTs, MCTs, MTOs, MOSFETs and silicon carbide devices.

12. A three-level neutral point clamped (NPC) converter comprising first and second outer switching devices and first and second inner switching devices, wherein the first inner and the second inner switching device are connected in series at a first mid point; the second inner and the second outer switching devices are connected in series at a second mid point and the first outer and the first inner switching device are connected in series at a third mid point;

first and second diodes and a split DC link having a fourth mid point connected across first and second outer switching devices wherein the first diode is connected between the fourth mid point and the third mid point, and the second diode is connected in between the fourth mid point and the second mid point;

a controller configured to provide control signals to maintain the outer switching devices in an ON state while alternately switching the inner switching devices to ON and OFF states when a DC link voltage of a leg of the NPC converter is less than one-half of a rated DC link voltage of the NPC converter;

wherein the controller is further configured to provide control signals when a DC link voltage of a leg of the NPC converter is at least one-half of the rated DC link voltage of the NPC converter to alternatively switch the first outer switching device and second inner switching device to ON states while the first inner switching device and the second outer switching device are in ON state and OFF state respectively to generate positive output voltage.

13. The three level NPC converter of claim 12, wherein the controller is further configured to provide control signals when a DC link voltage of a leg of the NPC converter is at least one-half of the rated DC link voltage of the NPC converter to maintain the mechanical switches in OFF state and to alternatively switch the first inner switching device and the second outer switching device to ON and OFF states while the first outer switching device and the second inner switching device are in OFF state and ON state respectively to generate negative output voltage.

14. The three level NPC converter of claim 12 further comprising first and second mechanical switches connected across first and second outer switching devices.

15. The three level NPC converter of claim 14, wherein the controller is configured to provide control signals to maintain the mechanical switches in an ON state when the DC link voltage of a leg of the NPC converter is less than one-half of the rated DC link voltage of the NPC converter.

16. The three level NPC converter of claim 14, wherein the controller is configured to provide control signals to maintain the mechanical switches in an OFF state when the DC link voltage of a leg of the NPC converter is at least one-half of the rated DC link voltage of the NPC converter.

17. The three level NPC converter of claim 12, wherein the three level converter comprises a single phase three level converter.

18. The three level NPC converter of claim 12, wherein the three level converter comprises a three phase three level converter.

19. The three level NPC converter of claim 12, wherein the switching devices are selected from the group consisting of IGBTs, IGCTs, MCTs, MTOs, MOSFETs and silicon carbide devices.

* * * * *